(12) United States Patent  (10) Patent No.: US 8,700,248 B2
Kawai  (45) Date of Patent: Apr. 15, 2014

(54) CHARGE AND DISCHARGE CONTROL APPARATUS AND METHOD

(75) Inventor: Takashi Kawai, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/882,570

(22) PCT Filed: Nov. 17, 2010

(86) PCT No.: PCT/JP2010/070490
§ 371 (c)(1),
(2), (4) Date: Apr. 30, 2013

(87) PCT Pub. No.: WO2012/066657
PCT Pub. Date: May 24, 2012

(65) Prior Publication Data
US 2013/0226386 A1 Aug. 29, 2013

(51) Int. Cl.
B60W 20/00 (2006.01)
(52) U.S. Cl.
USPC .............................. 701/22; 903/930; 320/160
(58) Field of Classification Search
CPC ..... B60W 20/00; B60W 10/06; B60W 10/08; B60W 10/24
USPC .......... 701/22, 99, 54, 101, 103, 84; 318/139; 320/109, 132, 155, 104, 146; 180/65.1, 180/65.21, 65.265, 65.275, 65.28, 65.29; 903/903, 905, 907; 477/20
See application file for complete search history.

(56) References Cited

U.S. PATENT DOCUMENTS 5,621,304 A * 4/1997 Kiuchi et al. ................... 322/18
6,067,801 A * 5/2000 Harada et al. .................. 60/705
6,104,166 A 8/2000 Kikuchi et al.

FOREIGN PATENT DOCUMENTS

| JP | A-11-185823 | | 7/1999 |
|----|----|----|----|
| JP | A-2000-152420 | | 5/2000 |
| JP | 2006033969 A | * | 2/2006 |
| JP | A-2010-193665 | | 9/2010 |

* cited by examiner

Primary Examiner — Helal A Algahaim
Assistant Examiner — Genna Mott
(74) Attorney, Agent, or Firm — Oliff PLC (57) ABSTRACT

A charge and discharge control apparatus is provided with: a setting device which is configured to set a hunting allowable period (T), which is a hunting period in which hunting of engine power is allowed; and a calculating device which is configured to calculate a charge and discharge amount of a battery by multiplying a difference between a state of charge (SOC) of the battery and a target SOC, which is a target value of the SOC, by a charge and discharge coefficient determined on the basis of the hunting allowable period.

9 Claims, 5 Drawing Sheets

FIG. 7

CHARGE AND DISCHARGE CONTROL APPARATUS AND METHOD

TECHNICAL FIELD

The present invention relates to a charge and discharge control apparatus and a charge and discharge control method, which are configured to control the charge and discharge of a battery mounted on a vehicle, such as, for example, a hybrid vehicle.

BACKGROUND ART

An apparatus is known which is mounted on a hybrid vehicle provided with a generator for generating electricity using engine power, and a battery (a storage battery) charged by the generator, and which is configured to control the charge and discharge of the battery such that a state of charge (SOC) of the battery is a target SOC (e.g. refer to Patent documents 1 and 2).

For example, Patent document 1 discloses that a used percentage of the SOC of a battery is expanded and the battery is efficiently used by changing the target SOC, as occasion demands, on the basis of an average charge and discharge amount of the battery. For example, Patent document 2 discloses that charge and discharge control is performed in view of dispersion of the amount of electricity stored in the battery. In addition, as a prior art document related to the present invention, there is Patent document 3.

PRIOR ART DOCUMENT

Patent Document

Patent document 1: Japanese Patent Application Laid Open No. 2000-152420
Patent document 2: Japanese Patent Application Laid Open No. Hei 11-185823
Patent document 3: Japanese Patent Application Laid Open No. 2010-193665

DISCLOSURE OF INVENTION

Subject to be Solved by the Invention

However, for example, according to the technology disclosed in the aforementioned Patent document 1, there is such a technical problem that it is hard to improve convergence properties, which are to make the SOC converge to the target SOC, because an inclination of a charge and discharge amount with respect to a difference between the SOC and the target SOC is constant. Moreover, for example, if the inclination of the charge and discharge amount with respect to the difference between the SOC and the target SOC is simply increased in order to improve the convergence properties of the SOC, the discharge and the charge of the battery are likely frequently repeated. Therefore, a hunting phenomenon (hereinafter simply referred to as "hunting") likely occurs in which the engine power for operating the generator oscillates. As a result, a driver or passenger of a vehicle likely feels uncomfortable due to the hunting.

In view of the aforementioned problems, it is therefore an object of the present invention to provide a charge and discharge control apparatus and a charge and discharge control method, which are configured to quickly make the SOC of the battery converge to the target SOC, while hardly making or without making the driver and the passenger of the vehicle feel uncomfortable.

Means for Solving the Subject

The above object of the present invention can be achieved by a charge and discharge control apparatus which is mounted on a vehicle comprising an engine, a generator capable of generating electricity using engine power of the engine, and a battery charged with the electricity generated by the generator, and which is configured to control charge and discharge of the battery, said charge and discharge control apparatus provide with: a setting device which is configured to set a hunting allowable period, which is a hunting period in which hunting of the engine power is allowed; and a calculating device which is configured to calculate a charge and discharge amount of the battery by multiplying a difference between a state of charge (SOC) of the battery and a target SOC, which is a target value of the SOC, by a charge and discharge coefficient determined on the basis of the hunting allowable period.

According to the charge and discharge control apparatus of the present invention, in operation thereof, the charge and discharge of the battery are controlled such that the SOC of the battery (storage battery) is the target SOC. Here, the "SOC" is an index value indicating a charge state of the battery and is a ratio of a current charge amount (i.e. remaining capacity or remaining amount of electricity stored) to full charging capacity of the battery. The SOC is 100 [%] when the battery is in a full charging state, and is 0 [%] when the battery completely discharges and the remaining capacity is zero. Moreover, the "control center SOC" is a target value of the SOC when the charge and discharge of the battery is controlled, in other words, a SOC which is a center value when the charge and discharge of the battery is controlled, and for example, it is set to 50 to 60 [%]. For example, if the SOC is less than the target SOC, the charge and discharge control apparatus of the present invention brings the SOC close to the target SOC by charging the battery with the electricity generated by the generator using the engine power. If the SOC is greater than the target SOC, the charge and discharge control apparatus of the present invention brings the SOC close to the target SOC by discharging the battery.

Particularly in the present invention, the setting device sets the hunting allowable period. The "hunting allowable period" of the present invention is a hunting period (period of oscillation) in which the hunting of the engine power (i.e. oscillation of the engine power) is allowed, and is a hunting period that does not make a driver or passenger of the vehicle feel uncomfortable (i.e. that is allowed by the driver or passenger of the vehicle in terms of his or her senses) even through the hunting of the engine power occurs. In general, as the hunting period of the engine power becomes longer, the driver or passenger of the vehicle hardly feels uncomfortable, and as the hunting period of the engine power becomes shorter, the driver or passenger of the vehicle easily feels uncomfortable. The setting device sets, for example, the shortest hunting period, out of a relatively long range of the hunting period which does not make the driver or passenger of the vehicle feel uncomfortable, as the hunting allowable period. The hunting allowable period can be determined in advance on the basis of experiments, simulations, or the like. For example, the hunting allowable period determined in advance in this manner is stored in advance in a memory provided for the setting device. The setting device performs the setting by reading the hunting allowable period from the memory.

The calculating device calculates the charge and discharge amount of the battery by multiplying the difference between the SOC of the battery and the target SOC, by the charge and discharge coefficient determined on the basis of the hunting allowable period. In other words, the calculating device firstly determines the charge and discharge coefficient on the basis of the hunting allowable period. Here, the charge and discharge coefficient is an inclination (or proportionality constant) of the charge and discharge of the battery with respect to the difference between the SOC and the target SOC, and can be rephrased as a gain value when the charge and discharge amount of the battery is determined on the basis of the difference between the SOC and the target SOC. The calculating device calculates the charge and discharge coefficient by dividing a product between battery capacity and battery voltage of the battery by the hunting allowable period. The calculating device then calculates the charge and discharge amount of the battery by multiplying the difference between the SOC and the target SOC by the charge and discharge coefficient. Here, particularly in the present invention, the charge and discharge coefficient is determined on the basis of the hunting allowable period. Thus, the driver or passenger of the vehicle hardly feels uncomfortable or does not feel uncomfortable at all even if the hunting of the engine power occurs by controlling the charge and discharge of the battery on the basis of the calculated charge and discharge amount. Moreover, the calculating device can determine the charge and discharge coefficient to have, for example, a maximum value within a range in which the hunting of the engine power does not make the driver or passenger of the vehicle feel uncomfortable. Thus, the calculating device can calculate, for example, the maximum value within the range in which the driver or passenger of the vehicle does not have an uncomfortable feeling due to the hunting of the engine power. Therefore, it is possible to quickly make the SOC of the battery converge to the control center SOC (i.e. it is possible to increase convergence properties in which the SOC of the battery converges to the control center SOC), with hardly providing or without providing the driver or passenger of the vehicle with an uncomfortable feeling due to the hunting of the engine power.

As explained above, according to the charge and discharge control apparatus of the present invention, it is possible to quickly make the SOC of the battery converge to the control center SOC, with hardly making or without making the driver or passenger of the vehicle feel uncomfortable.

In one aspect of the charge and discharge control apparatus of the present invention, wherein said setting device sets the hunting allowable period in accordance with a parameter indicating a driving state of the vehicle.

According to this aspect, the setting device sets the hunting allowable period in accordance with the parameter indicating the driving state of the vehicle (e.g. a change amount of the engine power, a vehicle speed, an accelerator opening degree, etc.). For example, if the driving state of the vehicle hardly provides the driver or passenger of the vehicle with an uncomfortable feeling due to the hunting of the engine power (e.g. in a case where the vehicle is driving on a mountain road and a change in the engine power is large), the setting device sets the hunting allowable period to be relatively short. On the other hand, if the driving state of the vehicle easily provides the driver or passenger of the vehicle with an uncomfortable feeling due to the hunting of the engine power (e.g. in a case where the vehicle is driving at a constant high speed and a change in the engine power is small), the setting device sets the hunting allowable period to be relatively long. This makes it possible to certainly prevent the driver or passenger of the vehicle from feeling uncomfortable, and to make the SOC of the battery converge to the control center SOC, more quickly.

In one aspect of the charge and discharge control apparatus of the present invention, wherein the parameter includes a change amount of the engine power, and said setting device sets the hunting allowable period to have a smaller value as the change amount of the engine power becomes larger.

In this case, it is possible to certainly prevent the driver or passenger of the vehicle from feeling uncomfortable, and to make the SOC of the battery converge to the control center SOC, more quickly.

In one aspect of the charge and discharge control apparatus of the present invention, wherein the parameter includes a vehicle speed of the vehicle, and said setting device sets the hunting allowable period to have a smaller value as the vehicle speed becomes higher.

In this case, it is possible to certainly prevent the driver or passenger of the vehicle from feeling uncomfortable, and to make the SOC of the battery converge to the control center SOC, more quickly.

In one aspect of the charge and discharge control apparatus of the present invention, wherein the parameter includes an accelerator opening degree of the vehicle, and said setting device sets the hunting allowable period to have a smaller value as the accelerator opening degree becomes higher.

In this case, it is possible to certainly prevent the driver or passenger of the vehicle from feeling uncomfortable, and to make the SOC of the battery converge to the control center SOC, more quickly.

The above object of the present invention can be achieved by a charge and discharge control method which is configured to control charge and discharge of a battery, in a vehicle comprising an engine, a generator capable of generating electricity using engine power of the engine, and the battery charged with the electricity generated by the generator, said charge and discharge control method provide with: a setting process which is configured to set a hunting allowable period, which is a hunting period in which hunting of the engine power is allowed; and a calculating process which is configured to calculate a charge and discharge amount of the battery by multiplying a difference between a state of charge (SOC) of the battery and a target SOC, which is a target value of the SOC, by a charge and discharge coefficient determined on the basis of the hunting allowable period.

According to the charge and discharge control method of the present invention, it is possible to receive the various benefits of the charge and discharge control apparatus of the present invention described above.

Incidentally, the charge and discharge control method of the present invention can also adopt various aspects in association with the various aspects of the charge and discharge control apparatus of the present invention described above.

The operation and other advantages of the present invention will become more apparent from Mode for Carrying Out the Invention explained below,

MODE FOR CARRYING OUT THE INVENTION

Hereinafter, embodiments of the present invention will be explained with reference to the drawings.

First Embodiment

A charge and discharge control apparatus in a first embodiment will be explained with reference to FIG. 1 to FIG. 3.

Firstly, with reference to FIG. 1, an explanation will be given to an entire configuration of a hybrid vehicle to which the charge and discharge control apparatus in the first embodiment is applied.

Figure 1:
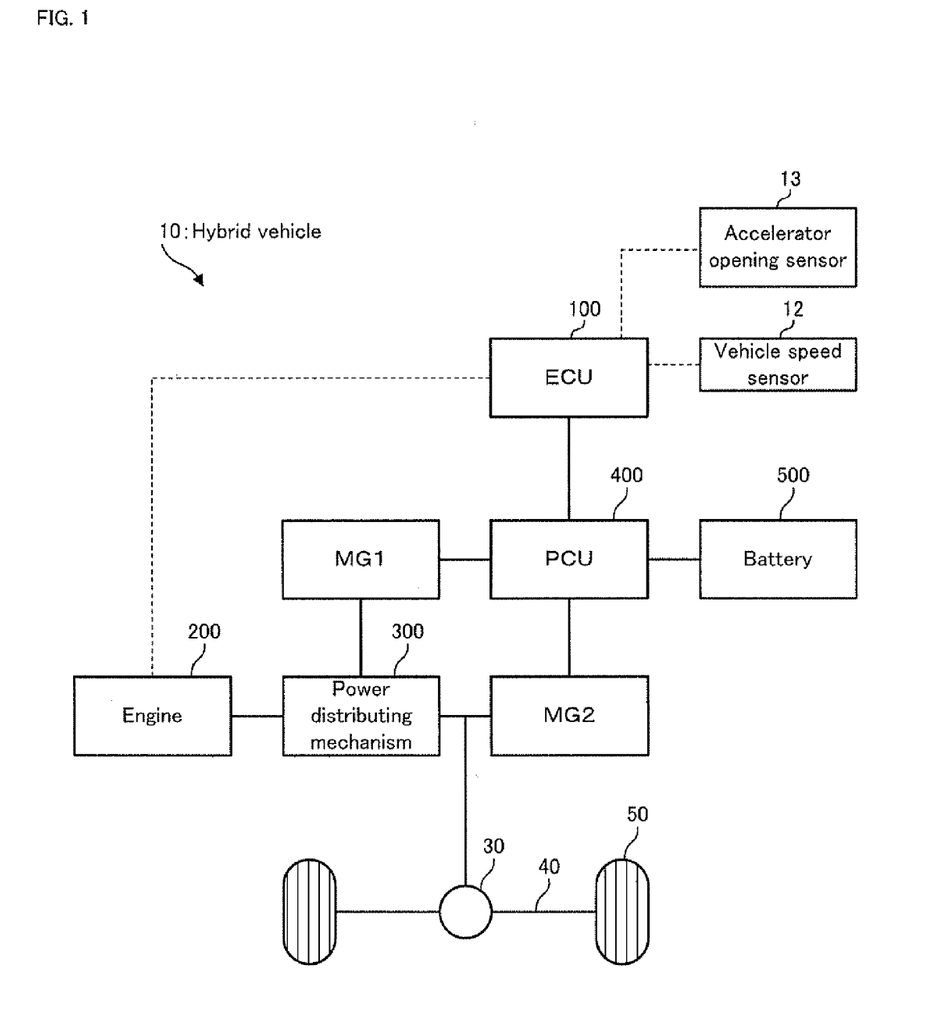
FIG. 1 is a schematic block diagram illustrating a configuration of a hybrid vehicle in a first embodiment.

FIG. 1 is a schematic block diagram illustrating the configuration of the hybrid vehicle in the first embodiment.

In FIG. 1, a hybrid vehicle 10 in the first embodiment, which is one example of the "vehicle" of the present invention, is provided with an electronic control unit (ECU) 100, an engine 200, a motor generator MG1, a motor generator MG2, a power distributing mechanism 300, a power control unit (PCU) 400, a battery 500, a vehicle speed sensor 12, an accelerator opening sensor 13, a reduction gear mechanism (or speed reduction mechanism) 30, an axle 40, and wheels 50.

The ECU 100 is provided with a central processing unit (CPU), a read only memory (ROM), a random access memory (RAM) and the like. The ECU 100 is an electronic control unit which is configured to control the entire operation of the hybrid vehicle 1. The ECU 100 is configured to perform various controls in the hybrid vehicle 10 in accordance with a control program stored, for example, in the ROM or the like. The ECU 100 functions as one example of the "charge and discharge control apparatus" of the present invention. Specifically, the ECU 100 functions as one example of each of the "setting device" and the "calculating device" of the present invention.

The engine 200 is a gasoline engine as one example of the "engine" of the present invention, and is configured to function as a power source of the hybrid vehicle 10. Incidentally, the "engine" of the present invention includes a two-cycle or four-cycle reciprocating engine or the like, has at least one cylinder, and conceptually includes an internal combustion engine which is configured to extract, as a driving force, a force generated in the combustion of a fuel-air mixture including various fuels, such as, for example, gasoline, light oil, or alcohol, in a combustion chamber in the cylinder, via a physical or mechanical transmitting device, such as, for example, a piston, a connecting rod, and a crank shaft, as occasion demands.

The motor generator MG1 is an electric motor generator as one example of the "generator" of the present invention, and has a power running function for converting electrical energy into kinetic energy and a regeneration function for converting the kinetic energy into the electrical energy. The motor generator MG1 is configured to function as a generator for charging the battery 500 or a generator for supplying electricity to the motor generator MG2, and as an electric motor for cranking the engine 200. The motor generator MG1 is configured to generate electricity using engine power supplied from the engine 200 (i.e. output of the engine 200) via the power distributing mechanism 300 described later.

The motor generator MG2 is an electric motor generator, and as in the motor generator MG1, the motor generator MG2 has the power running function for converting the electrical energy into the kinetic energy and the regeneration function for converting the kinetic energy into the electrical energy. The motor generator MG2 is configured to function mainly as an electric motor for assisting (aiding) the output of the engine 200 and is configured to transmit power to the axle 40 via the reduction gear mechanism 30 including various reduction gears, such as a differential. The axle 40 is coupled with the wheels 50, which are drive wheels of the hybrid vehicle 10.

Incidentally, each of the motor generators MG1 and MG2 described above is configured, for example, as a synchronous electric motor generator, and each motor generator is provided with: a rotor having a plurality of permanent magnets on an outer circumferential surface thereof; and a stator around which a three-phase coil for forming a rotating magnetic field is formed. However, each motor generator may have another configuration.

The PCU 400 includes an inverter which is configured to convert direct-current (DC) power extracted from the battery 500 to alternating-current (AC) power and supply it to the motor generators MG1 and MG2 and which is configured to convert AC power generated by the motor generators MG1 and MG2 to DC power and supply it to the battery 500. Moreover, the PCU 400 is a control unit which is configured to control the input/output of electricity between the battery 500 and each motor generator. The PCU 400 is electrically connected to the ECU 100, and the operation thereof is controlled by the ECU 100.

The battery 500 is a chargeable storage battery which functions as a power supply source associated with electricity for powering the motor generators MG1 and MG2. The charge and discharge of the battery 500 are controlled by the ECU 100. Incidentally, the battery 500 is one example of the "battery" of the present invention.

The power distributing mechanism 300 is a planetary gear (a planetary gear mechanism) which is configured to distribute the output of the engine 200 to the motor generator MG1 and the axle 40. For example, the power distributing mechanism 300 is provided with: a sun gear disposed in a central part thereof; a ring gear concentrically disposed on the outer circumference of the sun gear; a plurality of pinion gears disposed between the sun gear and the ring gear and revolving around the sun gear on the outer circumference of the sun gear while rotating on its own axis; and a carrier for supporting a rotating shaft of each pinion gear. The sun gear is coupled with a rotor of the motor generator MG1 such that a rotating shaft thereof is shared. The number of revolutions of the sun gear is equivalent to the number of revolutions of the motor generator MG1. Moreover, the ring gear is coupled with the axle 40 via the reduction gear mechanism 30. The number of revolutions of the ring gear is equivalent to the number of revolutions of the axle 40. Moreover, the carrier is coupled with a crankshaft 205 of the engine 200. The number of revolutions of the carrier is equivalent to the number of revolutions of the engine 200. In this case, the power distributing mechanism 300 is a rotational two-degree of freedom planetary gear mechanism provided with a plurality of rotational elements which have a differential relation with one another.

If the number of revolutions of two elements out of the sun gear, the carrier, and the ring gear is determined, the number of revolutions of the remaining one rotational element is inevitably determined.

The vehicle speed sensor 12 is a sensor which is configured to detect a vehicle speed or velocity of the hybrid vehicle 10. The vehicle speed sensor 12 is electrically connected to the ECU 100, and the detected vehicle speed is referred to by the ECU 100 with a regular or irregular period.

The accelerator opening sensor 13 is a sensor which is configured to detect an accelerator opening degree of a not-illustrated accelerator pedal provided for the hybrid vehicle 10. The accelerator opening sensor 13 is electrically connected to the ECU 100, and the detected accelerator opening degree is referred to by the ECU 100 with a regular or irregular period.

Next, an outline of charge and discharge control of the battery 500 will be explained with reference to FIG. 2.

Figure 2:
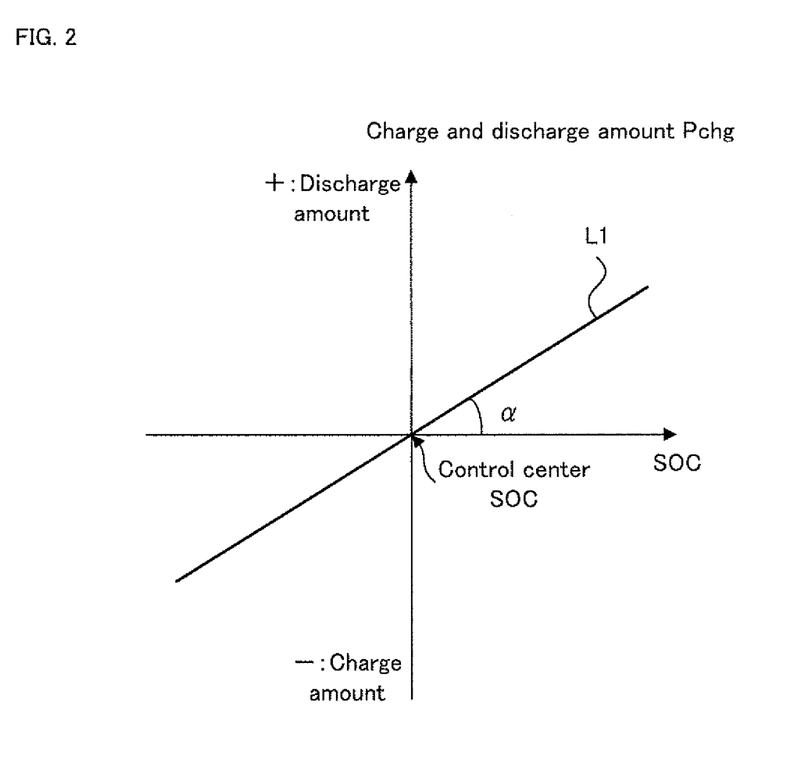
FIG. 2 is a graph for explaining an outline of charge and discharge control of a battery in the first embodiment.

FIG. 2 is a graph for explaining the outline of the charge and discharge control of the battery 500. In FIG. 2, a horizontal axis indicates a SOC of the battery 500, and a vertical axis indicates a charge and discharge amount Pchg, which is electric energy (power) for charging or discharging the battery 500. If the charge and discharge amount Pchg has a positive (+) value, it indicates a discharge amount for discharging the battery 500, and if the charge and discharge amount Pchg has a negative (−) value, it indicates a charge amount for charging the battery 500. A linear line L1 indicates one example of the charge and discharge amount Pchg set with respect to the SOC.

In FIG. 2, the ECU 100 performs the charge and discharge control of the battery 500 such that the SOC of the battery 500 is a control center SOC. Here, the SOC is an index value indicating a charge state of the battery 500 and is a ratio of a current charge amount (i.e. remaining capacity) to full charging capacity of the battery 500. The SOC is 100 [%] when the battery 500 is in a full charging state, and is 0 [%] when the battery 500 completely discharges and the remaining capacity is zero. Moreover, the control center SOC is a SOC which is a control center when the charge and discharge control of the battery 500 is performed, and for example, it is set to 50 to 60 [%]. Incidentally, the control center SOC is one example of the "target SOC" of the present invention.

In other words, the ECU 100 sets the charge and discharge amount Pchg in accordance with the SOC such that a relation between the SOC and the charge and discharge amount Pchg is as illustrated by the linear line L1.

Specifically, if the SOC is less than the control center SOC, the ECU 100 sets the charge and discharge amount Pchg to have a negative value so as to bring the SOC close to the control center SOC, and charges the battery 500. In other words, if the SOC is less than the control center SOC, the charge amount is set as the charge and discharge amount Pchg such that the SOC is brought close to the control center SOC, and the battery 500 is charged with the electricity of the set charge and discharge amount Pchg. Moreover, if the SOC is greater than the control center SOC, the ECU 100 sets the charge and discharge amount Pchg to have a positive value so as to bring the SOC close to the control center SOC, and discharges the battery 500. In other words, if the SOC is greater than the control center SOC, the discharge amount is set as the charge and discharge amount Pchg such that the SOC is brought close to the control center SOC, and the electricity of the set charge and discharge amount Pchg is discharged from the battery 500. Moreover, if the SOC is equal to the control center SOC, the ECU 100 sets the charge and discharge amount Pchg to zero. Moreover, the ECU 100 sets the charge and discharge amount Pchg such that the charge amount or the discharge amount increases as a difference increases between the SOC and the control center SOC. In other words, the ECU 100 sets the charge and discharge amount Pchg such that the charge and discharge amount Pchg has a larger absolute value as the difference increases between the SOC and the control center SOC.

Next, the charge and discharge control of the battery 500 performed by the ECU 100 will be explained in detail with reference to FIG. 3.

Figure 3:
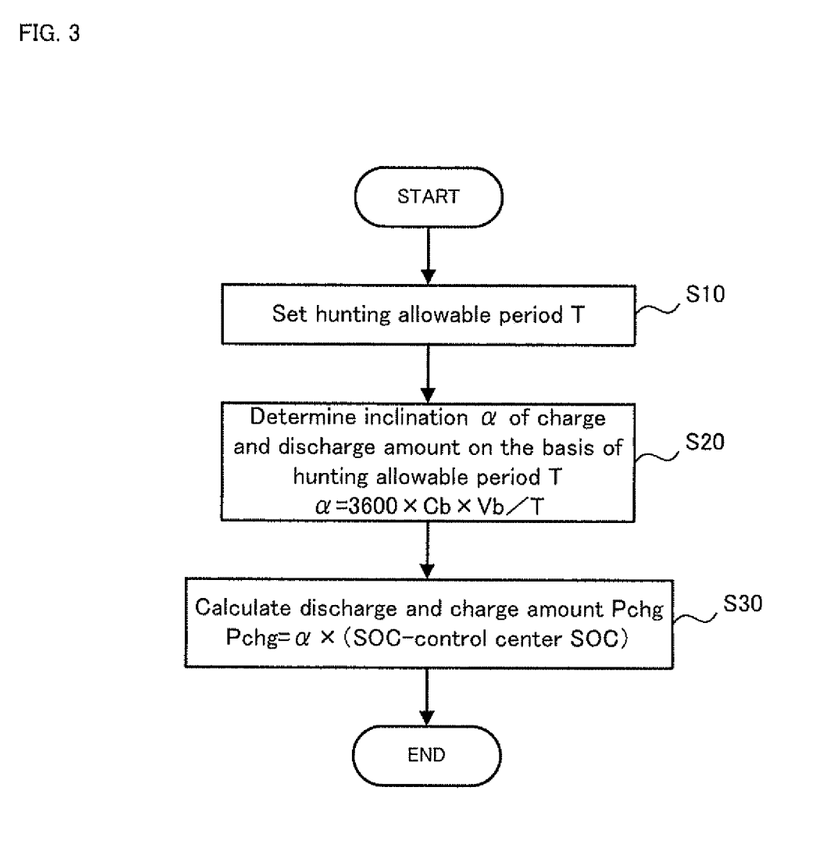
FIG. 3 is a flowchart illustrating a flow of the charge and discharge control of the battery in the first embodiment.

FIG. 3 is a flowchart illustrating a flow of the charge and discharge control of the battery 500.

In FIG. 3, in the charge and discharge control of the battery 500, firstly, a hunting allowable period T is set by the ECU 100 (step S10). Here, the hunting allowable period T is a hunting period (i.e. period of oscillation) in which the hunting of the engine power of the engine 200 (i.e. oscillation of the engine power) is allowed, and is a hunting period that does not make a driver or passenger of the hybrid vehicle 10 feel uncomfortable (i.e. that is allowed by the driver or passenger of the hybrid vehicle 10 in terms of his or her senses) even through the hunting of the engine power occurs. In general, as the hunting period of the engine power becomes longer, the driver or passenger of the hybrid vehicle 10 hardly feels uncomfortable, and as the hunting period of the engine power becomes shorter, the driver or passenger of the hybrid vehicle 10 easily feels uncomfortable. The ECU 100 sets, for example, the shortest hunting period, out of a relatively long range of the hunting period which does not make the driver or passenger of the hybrid vehicle 10 feel uncomfortable, as the hunting allowable period T. The hunting allowable period T can be determined in advance on the basis of experiments, simulations, or the like. The ECU 100 performs the setting by reading the hunting allowable period T determined in advance in this manner, from a memory. Incidentally, as illustrated in a second embodiment described later, the hunting allowable period T may be set in accordance with a driving state of the hybrid vehicle 10.

Then, an inclination α of the charge and discharge amount Pchg is determined by the ECU 100 on the basis of the hunting allowable period T (step S20). Specifically, the ECU 100 determines the inclination α of the charge and discharge amount Pchg with respect to the difference between the SOC and the control center SOC (i.e. the inclination α of the linear line L1 illustrated in FIG. 2) on the basis of the following equation (1). Incidentally, the inclination α is one example of the "charge and discharge coefficient" of the present invention.

$$\text{Inclination } \alpha = 3600 \times Cb \times Vb / \text{Hunting allowable period } T \quad (1)$$

In the equation (1), Cb indicates battery capacity of the battery 500 and its unit is ampere hour (i.e. A·h). Vb indicates battery voltage of the battery 500 and its unit is volt (i.e. V). A unit of the hunting allowable period T is second (i.e. s). A unit of the inclination α is watt (i.e. W). 3600 is a conversion constant for converting a unit of time (i.e. converting "hour" to "second").

Then, the charge and discharge amount Pchg is calculated by the ECU 100 on the basis of the inclination α, the SOC of the battery 500 and the control center SOC (step S30). Specifically, the ECU 100 calculates the charge and discharge amount Pchg on the basis of the following equation (2).

$$\text{Charge and discharge amount } Pchg = \text{Inclination } \alpha \times (SOC - \text{Control center SOC}) \quad (2)$$

The ECU 100 performs the charge and discharge control of the battery 500 in accordance with the calculated charge and discharge amount Pchg.

Particularly in the first embodiment, as described above, the inclination α of the charge and discharge amount Pchg with respect to the difference between the SOC and the control center SOC (also refer to FIG. 2) is determined on the basis of the equation (1) (the step S20). In other words, the inclination α is set as a smaller value as the hunting allowable period T becomes longer, and the inclination α is set as a larger value as the hunting allowable period T becomes shorter. Thus, even if the hunting of the engine power occurs due to the charge and discharge control of the battery 500 performed on the basis of the calculated charge and discharge amount Pchg, the driver or passenger of the hybrid vehicle 10 hardly feels uncomfortable or does not feel uncomfortable at all. In other words, particularly in the first embodiment, the inclination α is determined such that the hunting of the engine power does not occur with a period shorter than the hunting allowable period T, which is the hunting period that does not make the driver or passenger of the hybrid vehicle 10 feel uncomfortable (i.e. that is allowed by the driver or passenger of the hybrid vehicle 10 in terms of his or her senses) even though the hunting of the engine power occurs, and thus, the driver or passenger of the hybrid vehicle 10 hardly feels uncomfortable or does not feel uncomfortable at all.

Moreover, particularly in the first embodiment, the ECU 100 sets, for example, the shortest hunting period, out of a relatively long range of the hunting period which does not make the driver or passenger of the hybrid vehicle 10 feel uncomfortable, as the hunting allowable period T. Thus, the inclination α can be determined to have, for example, a maximum value within a range in which the hunting of the engine power does not make the driver or passenger of the hybrid vehicle 10 feel uncomfortable. Therefore, it is possible to quickly make the SOC of the battery 500 converge to the control center SOC (i.e. it is possible to increase convergence properties in which the SOC of the battery 500 converges to the control center SOC), with hardly providing or without providing the driver or passenger of the hybrid vehicle 10 with an uncomfortable feeling due to the hunting of the engine power.

Moreover, since the convergence properties of the SOC can be increased as described above, it is possible to reduce or prevent such situations that the SOC of the battery 500 exceeds an upper limit (e.g. 80% to 90%) set to protect the battery 500 from overcharge and that the SOC of the battery 500 falls below a lower limit (e.g. 20 to 30%) set to protect the battery 500 from over-discharge. It is thus possible to suppress a reduction in input and output of the battery 500, which is caused by the use of the battery 500 in the condition that the SOC is greater than the upper limit or that the SOC is less than the lower limit, thereby improving fuel efficiency and power performance of the hybrid vehicle 10. In addition, deterioration of the battery 500 can be suppressed.

As explained above, according to the first embodiment, it is possible to quickly make the SOC of the battery 500 converge to the control center SOC, with hardly making or without making the driver or passenger of the hybrid vehicle 10 feel uncomfortable.

Second Embodiment

A charge and discharge control apparatus in a second embodiment will be explained with reference to FIG. 4 to FIG. 7.

Figure 4:
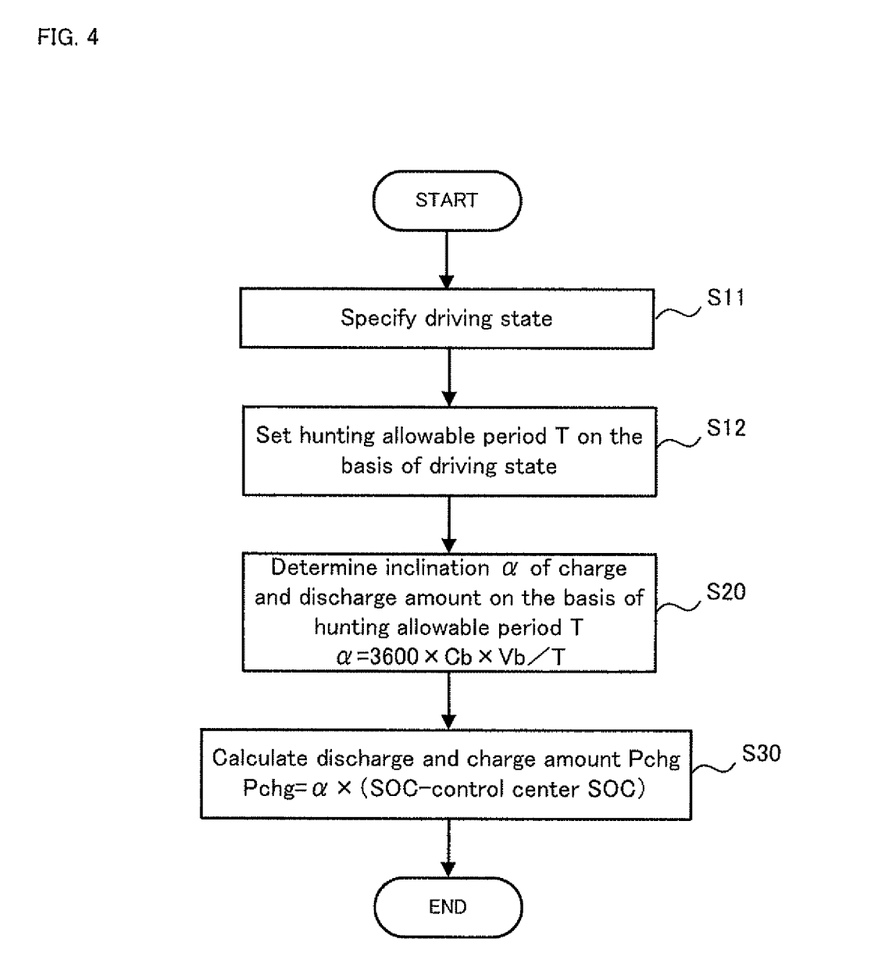
FIG. 4 is a flowchart illustrating a flow of the charge and discharge control of the battery in a second embodiment.

FIG. 4 is a flowchart illustrating a flow of the charge and discharge control of the battery in the second embodiment. Incidentally, in FIG. 4, the same steps as those of the charge and discharge control of the battery in the first embodiment illustrated in FIG. 3 will carry the same step numbers, and the explanation thereof will be omitted as occasion demands.

In FIG. 4, the charge and discharge control of the battery in the second embodiment is different from the charge and discharge control in the first embodiment described above in that the hunting allowable period T is set on the basis of the driving state of the hybrid vehicle 10 (refer to steps S11 and S12), and is substantially the same as the charge and discharge control in the first embodiment described above in other points.

In FIG. 4, in the charge and discharge control of the battery 500 in the second embodiment, firstly, the driving state of the hybrid vehicle 10 is specified by the ECU 100 (step S11). In other words, the ECU 100 obtains a vehicle speed, a accelerator opening degree, and an engine power change amount, which are parameters indicating the driving state of the hybrid vehicle 10. Incidentally, the ECU 100 obtains the vehicle speed from the vehicle speed sensor 12, and obtains the accelerator opening degree from the accelerator opening sensor 13. Moreover, the engine power change amount is the amount of a change in engine power outputted by the engine 200. The ECU 100 obtains an engine rotational speed and engine torque from a sensor(s) provided for the engine 200 and calculates the engine power change amount.

Then, the hunting allowable period T is set by the ECU 100 on the basis of the driving state (step S12). Specifically, the ECU 100 sets the hunting allowable period T on the basis of the vehicle speed, the accelerator opening degree, and the engine power, and maps illustrated in FIG. 5 to FIG. 7.

Figure 5:
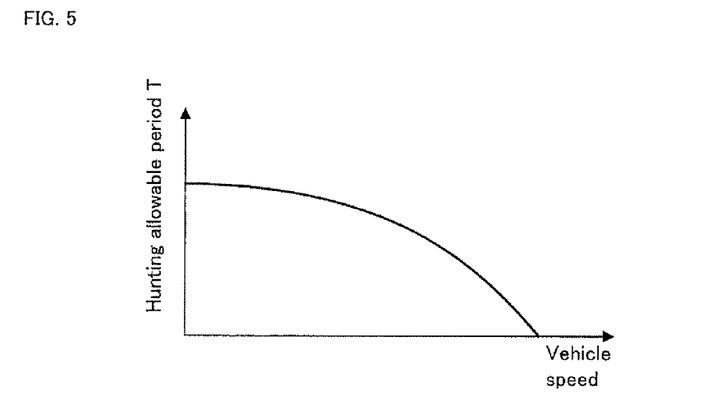
FIG. 5 is a graph conceptually illustrating a relation between a vehicle speed and a hunting allowable period in a map for setting the hunting allowable period.
Figure 6:
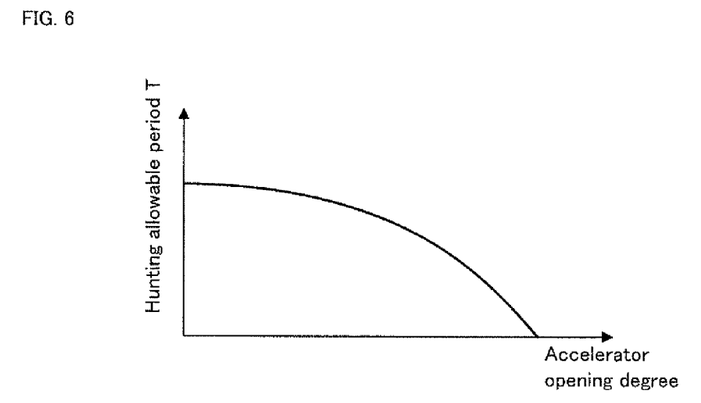
FIG. 6 is a graph conceptually illustrating a relation between an accelerator opening degree and the hunting allowable period in the map for setting the hunting allowable period.
Figure 7:
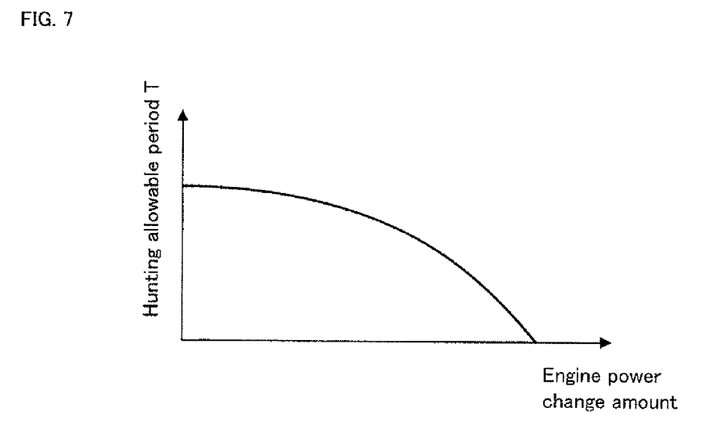
FIG. 7 is a graph conceptually illustrating a relation between an engine power change amount and the hunting allowable period T in the map for setting the hunting allowable period.

FIG. 5 conceptually illustrates a relation between the vehicle speed and the hunting allowable period T in the map for setting the hunting allowable period T. FIG. 6 conceptually illustrates a relation between the accelerator opening degree and the hunting allowable period T in the map for setting the hunting allowable period T. FIG. 7 conceptually illustrates a relation between the engine power change amount and the hunting allowable period T in the map for setting the hunting allowable period T.

As illustrated in FIG. 5 to FIG. 7, in the second embodiment, the ECU 100 sets the hunting allowable period T to have a smaller value (i.e. a shorted period) as each of the vehicle speed, the accelerator opening degree, and the engine power change amount becomes larger. The ECU 100 sets the hunting allowable period T to have a larger value (i.e. a longer period) as each of the vehicle speed, the accelerator opening degree, and the engine power change amount becomes smaller.

Here, for example, if the engine power change amount is relatively large, such as a case where the hybrid vehicle 10 is driving on a mountain road, the driver or passenger of the hybrid vehicle 10 hardly has an uncomfortable feeling due to the hunting of the engine power because the original engine power change amount is large even though the hunting of the engine power occurs with a relatively short hunting period. On the other hand, if the engine power change amount is relatively small, such as a case where the hybrid vehicle 10 is driving at a constant high speed, the driver or passenger of the hybrid vehicle 10 easily has an uncomfortable feeling due to the hunting of the engine power. Moreover, if the vehicle speed and the accelerator opening degree are large, the driver or passenger of the hybrid vehicle 10 hardly has an uncomfortable feeling due to the hunting of the engine power because vibration of the hybrid vehicle 10 is large, such as, for example, vibration caused by a contact between the wheels 50 of the hybrid vehicle 10 and a road surface. On the other hand, if the vehicle speed and the accelerator opening degree are small, the driver or passenger of the hybrid vehicle 10 easily has an uncomfortable feeling due to the hunting of the engine power because the vibration of the hybrid vehicle 10 is small, such as, for example, vibration caused by the contact between the wheels 50 of the hybrid vehicle 10 and the road surface.

Thus, in the second embodiment, the hunting allowable period T is set to have a smaller value as each of the vehicle speed, the accelerator opening degree, and the engine power change amount becomes larger. The hunting allowable period T is also stet to have a larger value as each of the vehicle speed, the accelerator opening degree, and the engine power change amount becomes smaller.

This makes it possible to certainly prevent the driver or passenger of the hybrid vehicle 10 from feeling uncomfortable, and to make the SOC of the battery 500 converge to the control center SOC, more quickly.

In other words, according to the second embodiment, if the driving state of the hybrid vehicle 10 hardly provides the driver or passenger of the hybrid vehicle 10 with an uncomfortable feeling due to the hunting of the engine power (i.e. if the vehicle speed, the accelerator opening degree, or the engine power change amount is large), the ECU 100 sets the hunting allowable period T to be relatively short, and if the driving state of the hybrid vehicle 10 easily provides the driver or passenger of the hybrid vehicle 10 with an uncomfortable feeling due to the hunting of the engine power (i.e. if the vehicle speed, the accelerator opening degree, or the engine power change amount is small), the ECU 100 sets the hunting allowable period T to be relatively long (step S12). The ECU 100 thus determines the inclination $\alpha$ to have a relatively large value if the driving state of the hybrid vehicle 10 hardly provides the driver or passenger of the hybrid vehicle 10 with an uncomfortable feeling due to the hunting of the engine power (refer to the equation (1)), and determines the inclination $\alpha$ to have a relatively small value if the driving state of the hybrid vehicle 10 easily provides the driver or passenger of the hybrid vehicle 10 with an uncomfortable feeling due to the hunting of the engine power (refer to the equation (1)).

Therefore, according to the second embodiment, it is possible to further increase the convergence properties in which the SOC converges to the control center SOC in cases where the driving state of the hybrid vehicle 10 hardly causes an uncomfortable feeling due to the hunting of the engine power. Moreover, even if the driving state of the hybrid vehicle 10 easily causes an uncomfortable feeling due to the hunting of the engine power, it hardly provides or does not provide the driver or passenger of the hybrid vehicle 10 with an uncomfortable feeling due to the hunting of the engine power.

As explained above, according to the second embodiment, it is possible to more quickly make the SOC of the battery 500 converge to the control center SOC, with hardly making or without making the driver or passenger of the hybrid vehicle 10 feel uncomfortable.

The present invention is not limited to the aforementioned embodiments, but various changes may be made, if desired, without departing from the essence or spirit of the invention which can be read from the claims and the entire specification. A charge and discharge control apparatus, which involves such changes, is also intended to be within the technical scope of the present invention.

DESCRIPTION OF REFERENCE CODES

12 vehicle speed sensor
13 accelerator opening sensor
50 wheel
100 ECU
200 engine
300 power distributing mechanism
400 PCU
MG1, MG2 motor generator
500 battery

The invention claimed is:

1. A charge and discharge control apparatus which is mounted on a vehicle comprising an engine, a generator capable of generating electricity using engine power of the engine, and a battery charged with the electricity generated by the generator, and which is configured to control charge and discharge of the battery, said charge and discharge control apparatus comprising:
   a setting device which is configured to set a hunting allowable period, which is a hunting period in which hunting of the engine power is allowed; and
   a calculating device which is configured to calculate a charge and discharge amount of the battery by multiplying a difference between a state of charge (SOC) of the battery and a target SOC, which is a target value of the SOC, by a charge and discharge coefficient determined on the basis of the hunting allowable period.

2. The charge and discharge control apparatus according to claim 1, wherein said setting device sets the hunting allowable period in accordance with a parameter indicating a driving state of the vehicle.

3. The charge and discharge control apparatus according to claim 2, wherein
   the parameter includes a change amount of the engine power, and
   said setting device sets the hunting allowable period to have a smaller value as the change amount of the engine power becomes larger.

4. The charge and discharge control apparatus according to claim 2, wherein
   the parameter includes a vehicle speed of the vehicle, and
   said setting device sets the hunting allowable period to have a smaller value as the vehicle speed becomes higher.

5. The charge and discharge control apparatus according to claim 2, wherein
   the parameter includes an accelerator opening degree of the vehicle, and
   said setting device sets the hunting allowable period to have a smaller value as the accelerator opening degree becomes higher.

6. The charge and discharge control apparatus according to claim 3, wherein
   the parameter includes a vehicle speed of the vehicle, and
   said setting device sets the hunting allowable period to have a smaller value as the vehicle speed becomes higher.

7. The charge and discharge control apparatus according to claim 3, wherein
   the parameter includes an accelerator opening degree of the vehicle, and
   said setting device sets the hunting allowable period to have a smaller value as the accelerator opening degree becomes higher.

8. The charge and discharge control apparatus according to claim 4, wherein
   the parameter includes an accelerator opening degree of the vehicle, and said setting device sets the hunting allowable period to have a smaller value as the accelerator opening degree becomes higher.

9. The charge and discharge control apparatus according to claim 6, wherein
the parameter includes an accelerator opening degree of the vehicle, and
said setting device sets the hunting allowable period to have a smaller value as the accelerator opening degree becomes higher.

* * * * *